United States Patent
Purushotham et al.

(10) Patent No.: US 11,948,018 B2
(45) Date of Patent: Apr. 2, 2024

(54) METHODS AND SYSTEMS FOR DYNAMIC RECONFIGURING OF HARDWARE PERFORMANCE MONITORING UNIT (PMU) EVENTS

(71) Applicant: International Business Machines Corporation, Armonk, NY (US)

(72) Inventors: Srinivas Bangalore Purushotham, Bangalore (IN); Madhavan Srinivasan, Chennai (IN); Deepak K. Gangadhar, Malleswaram (IN)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 17/553,095

(22) Filed: Dec. 16, 2021

(65) Prior Publication Data

US 2023/0195542 A1    Jun. 22, 2023

(51) Int. Cl.
   *G06F 9/54*    (2006.01)
   *G06F 9/445*   (2018.01)
   *G06F 11/34*   (2006.01)

(52) U.S. Cl.
   CPC .......... *G06F 9/542* (2013.01); *G06F 9/44505* (2013.01); *G06F 11/3409* (2013.01)

(58) Field of Classification Search
   CPC ... G06F 9/542; G06F 9/44505; G06F 11/3409
   See application file for complete search history.

(56) References Cited

U.S. PATENT DOCUMENTS

| | | | |
|---|---|---|---|
| 6,898,718 B2 | 5/2005 | Morrow | |
| 7,490,117 B2 | 2/2009 | Subramoney et al. | |
| 7,814,485 B2 | 10/2010 | Morgan et al. | |
| 2003/0115506 A1* | 6/2003 | Edwards | G06F 11/3636 714/E11.214 |
| 2003/0120621 A1* | 6/2003 | McDaniel | G06N 5/02 706/45 |
| 2003/0219018 A1* | 11/2003 | Van Der Burg | H04M 3/2254 370/349 |
| 2004/0064549 A1* | 4/2004 | Brown | H04L 43/00 709/224 |

(Continued)

OTHER PUBLICATIONS

Deville, R. A., et al., "Performance Monitoring for Run-time Management of Reconfigurable Devices", Proceedings of The 2005 International Conference on Engineering of Reconfigurable Systems and Algorithms, ERSA 2005, Las Vegas, Nevada, USA, Jun. 27-30, 2005, 7 pages.

(Continued)

*Primary Examiner* — Tuan C Dao
(74) *Attorney, Agent, or Firm* — Scully, Scott, Murphy & Presser, P.C.

(57) ABSTRACT

A method, computer program product, and/or system is disclosed for changing the events monitored by a processor including: determining whether a change in the monitoring of the first event to the second different event has been requested; copying, in response to a request to change the monitoring of the first event to the second different event, op-codes from memory into microcode executable by a general processing engine; and executing the op-codes from memory by the general processing engine to change the first event monitored by the counter to the second different event.

18 Claims, 9 Drawing Sheets

(56) References Cited

U.S. PATENT DOCUMENTS

| | | | |
|---|---|---|---|
| 2004/0117599 A1* | 6/2004 | Mittal | H04L 9/40 |
| | | | 712/210 |
| 2005/0086028 A1* | 4/2005 | Jones | G06F 11/3466 |
| | | | 714/E11.2 |
| 2005/0268144 A1* | 12/2005 | Doering | G06F 1/14 |
| | | | 713/600 |
| 2006/0126523 A1* | 6/2006 | Shin | H04L 67/02 |
| | | | 370/389 |
| 2009/0320048 A1* | 12/2009 | Watt | G06F 9/4812 |
| | | | 718/100 |
| 2010/0082950 A1 | 4/2010 | Kinzhalin et al. | |
| 2012/0022832 A1 | 1/2012 | Shannon et al. | |
| 2013/0263209 A1* | 10/2013 | Panuganty | H04L 41/5025 |
| | | | 709/224 |
| 2015/0033266 A1* | 1/2015 | Klappert | H04N 21/4314 |
| | | | 725/52 |
| 2015/0378424 A1* | 12/2015 | Anyuru | G06F 1/3296 |
| | | | 713/320 |
| 2016/0066276 A1* | 3/2016 | Su | H04W 72/02 |
| | | | 370/252 |
| 2016/0224375 A1* | 8/2016 | Chiao | G06F 11/348 |
| 2017/0060476 A1* | 3/2017 | Chinnakkonda Vidyapoornachary | G11C 7/04 |
| 2017/0090955 A1 | 3/2017 | Hsiao et al. | |
| 2018/0302624 A1* | 10/2018 | Gadelrab | H04N 19/156 |
| 2019/0278677 A1* | 9/2019 | Terechko | G06F 11/27 |

OTHER PUBLICATIONS

IPcom000257035d, "Dynamically extending the hardware Performance Monitoring Unit (PMU) events using uncore engine", IP.com PAD, Jan. 12, 2019, 2 pages.

\* cited by examiner

METHODS AND SYSTEMS FOR DYNAMIC RECONFIGURING OF HARDWARE PERFORMANCE MONITORING UNIT (PMU) EVENTS

BACKGROUND

The disclosure herein relates generally to the field of monitoring the performance of integrated circuits, for example processors, including for example performance metrics and events to assist with debugging integrated circuit designs.

Resource monitoring is an important aspect of computer architecture, particularly in complex computing environments and in enterprise cloud computing. Monitoring the workload of different system resources, functional units and aspects for threats of or actual over-usage is important and typically is achieved by using Performance Monitoring Units (PMUs) in the system hardware. For example, there are counters in Performance Monitoring Units (PMU counters) to obtain information on the utilization of memory, buses/links, temperature, as well as other metrics. Measuring and monitoring performance using the PMU counters in the PMUs, however, uses cycles of the main processor core. Using cycles of the processor core to monitor performance will impact the performance of the system as performance monitoring would use core processor cycles that are intended to run the processor workload. Additionally, the existence of the PMU counters may be unknown to a user, and the user may not have the ability to change the events the PMU counter monitors. It would be advantageous to dynamically control and be able to change the configuration of the PMU control registers and collect performance data on new events, and/or to monitor performance metrics in a manner that does not interfere with the work-load of the core processor, by, for example, not using main CPU core processor cycles.

SUMMARY

The summary of the disclosure is given to aid understanding of performance monitoring of integrated circuits, for example microprocessors, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the techniques, methods, and/or systems for testing and verifying integrated circuits to achieve different effects.

A system, computer program product, and/or method according to one or more embodiments for dynamically monitoring performance metrics of an integrated circuit, e.g., a microprocessor, including in one or more embodiments changing the monitoring of a first event to a second event in a system, processor, and/or integrated circuit is disclosed, where in one or more approaches the system, computer program product and/or method includes: determining whether a change in the monitoring of the first event to the second different event has been requested; copying, in response to a request to change the monitoring of the first event to the second different event, op-codes from memory into microcode executable by a general-processing-engine (GPE); and executing the op-codes from memory by the general processing engine to change the first event monitored by the counter to the second different event. In an aspect, determining whether a change in the monitoring of the first event to the second different event has been requested comprises monitoring a communication area of memory for a change request to change the monitoring of the first event to a second event. The system, computer program product, and/or method in an embodiment further including requesting a change in the monitoring of the first event to the second different event, where in an approach wherein requesting a change in the monitoring of the first event to the second different event is made by a user.

In one or more embodiments, the system, computer program product, and/or method further includes determining whether a characteristic is less than a percentage; and changing, in response to the characteristic being less than the percentage, the monitoring of the first event to the second event, wherein the percentage is at least one of a group consisting of: user configurable, preset, predefined, fixed, adjustable, programable, and combinations thereof. The characteristic in an embodiment is at least one of a group consisting of: memory bandwidth, link utilization, memory headroom, and combinations thereof. The system, computer program product, and/or method further includes in an embodiment writing the op-codes into memory, and/or in an embodiment storing in memory the results of the second event in a different area of memory than the results of the first event. In an aspect, executing the op-codes from memory by the general processing engine changes the configuration of the counter to monitor the second different event. In an embodiment, the general-purpose-engine (GPE) is not part of processing cores of the processor and main memory is not local to the processor.

A data processing system is disclosed in a system that includes in one or more embodiments: a processor having one or more processing cores, one or more memory controllers, one or more general purpose engines and one or more links for communicatively coupling the one or more processing cores, the one or more memory controllers, and the one or more general processing engines, the processor further comprising one or more performance monitoring units having one or more counters, each counter having an associated configuration register; and main memory communicatively coupled to the processor via a memory bus, wherein the system is configured to: determine whether a change in the monitoring of a first event to a second different event has been requested; copy, in response to a request to change the monitoring of the first event to the second different event, op-codes from main memory into microcode executable by at least one of the general processing engines; and execute the op-codes from memory by the at least one of the general processing engines to change the first event monitored by one of the one or more counters to the second different event. The system further configured to monitor a communication area of main memory for a change request to change the monitoring of the first event to a second different event, and in an approach configured to set a flag in the communication area of main memory to request a change in the monitoring of the first event to the second different event. In a further embodiment, further including writing the op-codes into main memory, and executing the op-codes by the general processing engine changes a configuration of a counter monitoring the first event to monitor the second different event. The system is configured in an embodiment to change from a first mode of operation to a second mode of operation where a plurality but not all of the events monitored by the one or more counters are changed in response to a request to change the first event to a second different event.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, products, instruction programming, and/or systems for monitoring the performance metrics of integrated circuits, including for example, microprocessors, will be better understood when read in conjunction with the figures provided. It may be noted that in the figures provided a numbered element is typically numbered according to the figure in which the element is introduced, is typically referred to by that number throughout succeeding figures, and that like reference numbers generally represent like parts of exemplary embodiments of the invention. Embodiments are provided in the figures for the purpose of illustrating aspects, features, and/or various embodiments of the methods, techniques, products, instruction programming, and/or systems for monitoring performance metrics of integrated circuits, including for example microprocessors, but the claims should not be limited to the precise arrangement, structures, features, aspects, assemblies, subassemblies, systems, circuitry, functional units, programming, instructions, embodiments, methods, processes, or devices shown. The arrangements, structures, features, aspects, assemblies, subassemblies, functional units, programming, instructions, methods, processes, circuitry, embodiments, and devices shown may be used singularly or in combination with other arrangements, structures, assemblies, subassemblies, systems, features, functional units, programming, instructions, aspects, circuitry, embodiments, methods, processes, and devices.

DETAILED DESCRIPTION

Figure 1:
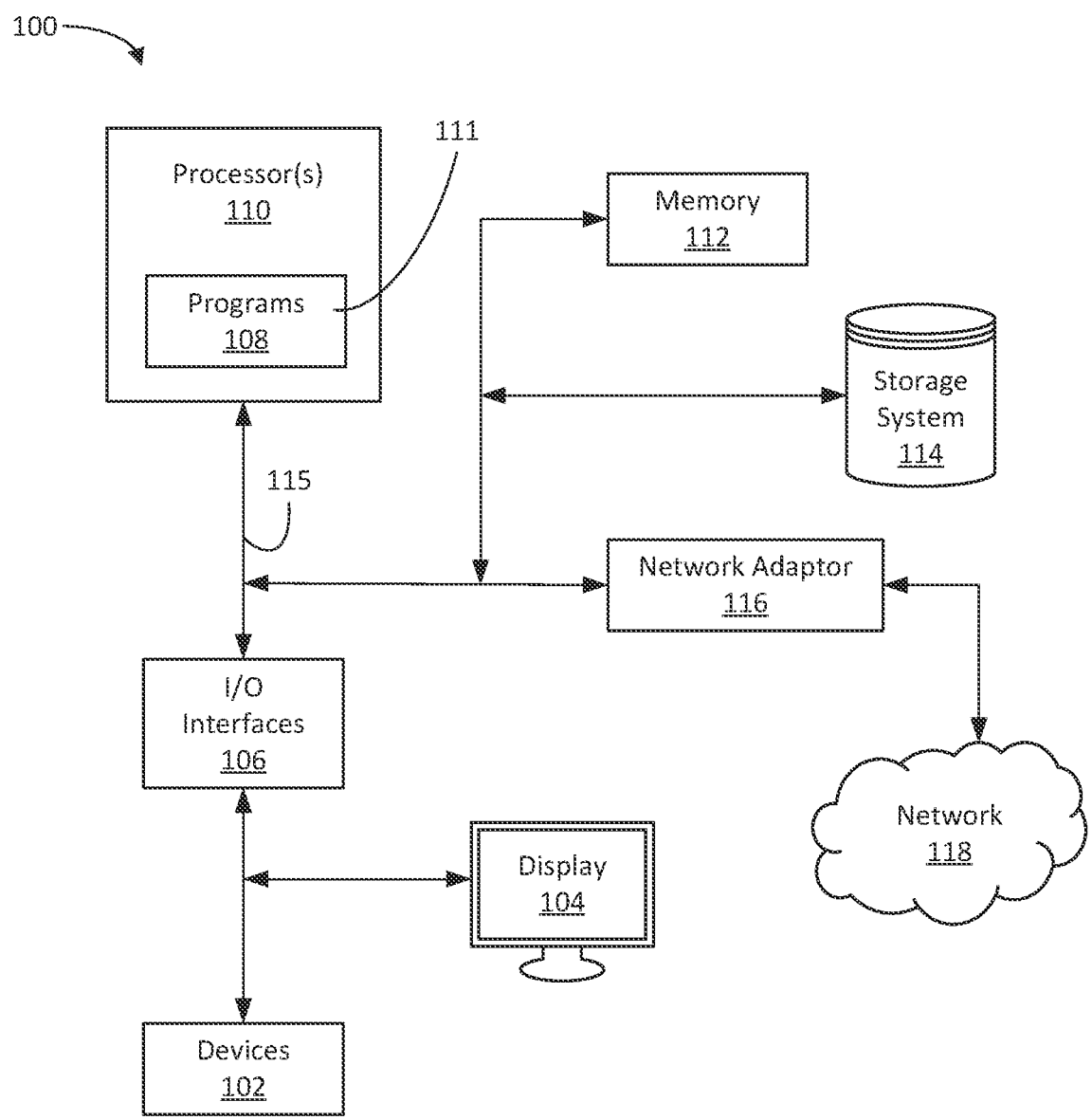
FIG. 1 schematically shows a block diagram of an exemplary computer system on which the present disclosure may be practiced according to an embodiment.

The following description is made for illustrating the general principles of the invention and is not meant to limit the inventive concepts claimed herein. In the following detailed description, numerous details are set forth in order to provide an understanding of methods, techniques, and systems for monitoring the performance metrics of an integrated circuit, e.g., a processor, however, it will be understood by those skilled in the art that different and numerous embodiments of the systems, methods, and/or techniques may be practiced without those specific details, and the claims and disclosure should not be limited to the embodiments, features, aspects, assemblies, subassemblies, structures, configurations, functional units, engines, counters, programming, instructions, processes, methods, or details specifically described and shown herein. In addition, features described herein can be used in combination with other described features in each of the various possible combinations and permutations.

Unless otherwise specifically defined herein, all terms are to be given their broadest possible interpretation including meanings implied from the specification as well as meanings as meanings understood by those skilled in the art and/or as defined in dictionaries, treatises, etc. It should also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes performance monitoring techniques and systems for integrated circuits, including, for example, processors and microprocessor systems and architectures, which are apparent to those skilled in the art. It is assumed that those skilled in the art are familiar with monitoring performance metrics of integrated circuits, including performance monitoring of processors, and the use of performance monitoring control registers and counters.

Resource monitoring is an important aspect of computer architecture, particularly in complex computing environments and in enterprise cloud computing. Monitoring the workload of different system resources, functional units, and aspects for threats of, or actual, over-usage is important. Monitoring computing system resources typically is achieved by using Performance Monitoring Units (PMUs) in the system hardware. For example, there are counters in Performance Monitoring Units (PMU counters) to obtain information on the utilization of memory, buses/links, temperature, as well as other metrics. Measuring and monitoring performance metrics and parameters using the PMU counters in the PMUs, however, typically uses cycles of the main processor core. Using cycles of the processor core to monitor performance will impact the performance of the system as performance monitoring would use core processor cycles that are intended to run the processor workload.

Disclosed is a system and method to have a dynamically configurable performance monitoring approach. In an embodiment, a system and/or method provides for dynamically changing the PMU configuration to monitor different events in a non-intrusive approach. According to one or more approaches an on-chip controller (OCC), e.g., a general-purpose engine (GPE) on the on-chip controller (OCC), is used to monitor performance metrics that does not use any of the processor/core cycles. According to an aspect, the configuration of the PMU control registers will change, for example to a new mode, and start collecting information, e.g., performance metrics, for new events. The new or second mode, referred to as a Debug Mode, according to one or more embodiments will use PMU counters that were used to measure the performance of different events in a normal or first mode, referred to as the Monitor Mode.

The system and/or method preferably can switch, for example in response to user input, between the Monitor Mode and the Debug Mode. In an example, based upon the scenarios encountered, a predefined set of events are configured for the Debug Mode, and those predefined set of events would be monitored for more details. Preferably, the system and/or method while in the new mode (Debug Mode) will continue to monitor the most important "Monitor Mode" events so that in an embodiment, the system/method does not lose track of monitoring the overall health of the system. According to an aspect, the system and/or method would have option to monitor important performance metrics of the system and a few-preselected events, for example events from power bus (PB), memory (MEM), etc., to help debug performance bottlenecks. In one or more embodiments, extra memory space is allocated to store the Debug Mode events. The extra memory space allocated for Debug Mode preferably is not used during Monitor Mode, and in an embodiment is used only during Debug Mode.

FIG. 1 illustrates an example computing and/or data processing system 100 in which aspects of the present disclosure may be practiced. It is to be understood that the computer and/or data processing system 100 depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 1 may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include any of the above systems or devices, and the like.

In some embodiments, the computer system 100 may be described in the general context of computer system executable instructions, embodied as program modules stored in memory 112, being executed by the computer system. Generally, program modules may include routines, programs, objects, components, logic, data structures, and so on that perform particular tasks and/or implement particular input data and/or data types in accordance with the present invention.

The components of the computer system 100 may include, but are not limited to, one or more processors or processing units 110, a memory 112, and a bus 115 that operably couples various system components, including memory 112 to processor 110. In one or more embodiments, the processor 110, which is also referred to as a central processing unit (CPU) or microprocessor, may execute one or more programs or modules 108, or portions of programs or modules 108, that are loaded from memory 112 to local memory 111, where the program module(s) embody software (program instructions) that cause the processor to perform one or more operations. In some embodiments, module 108 may be programmed into the integrated circuits of the processor 110, loaded from memory 112, storage device 114, network 118 and/or combinations thereof to local memory 111.

The processor (or CPU) 110 can include various functional units (decode units, dispatch units, issue units, history buffers), registers, buffers, execution units, caches, memories, and other units formed by integrated circuitry that will be described in more detail herein, and may operate according to reduced instruction set computing ("RISC") techniques. The processor 110 processes data according to processor cycles, synchronized, in one or more aspects, to an internal clock (not shown). Bus 115 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture (MCA) bus, Enhanced ISA (EISA) bus, Video Electronics Standards Association (VESA) local bus, and Peripheral Component Interconnects (PCI) bus. The computer system 100 may include a variety of computer system readable media, including non-transitory readable media. Such media may be any available media that is accessible by the computer system 100, and it may include both volatile and non-volatile media, removable and non-removable media.

Memory 112 (sometimes referred to as system or main memory) can include computer readable media in the form of volatile memory, such as random-access memory (RAM), cache memory and/or other forms. Computer system may further include other removable/non-removable, volatile/non-volatile computer system storage media. By way of example only, storage system 114 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces.

The computer system may also communicate with one or more external devices 102 such as, for example, a keyboard, track ball, mouse, microphone, speaker, a pointing device, a display 104, etc.; one or more devices that enable a user to interact with the computer system, such as for example, a keyboard, track ball, mouse, pointing device, microphone, speaker, etc.; and/or any devices (e.g., network card, modem, etc.) that enable the computer system to communicate with one or more other computing devices. Such communication can occur via Input/Output (I/O) interfaces 106. Communications or network adapter 116 interconnects bus 115 with an outside network 218 enabling the data processing system 100 to communicate with other such systems. Additionally, an operating system such as, for example, AIX ("AIX" is a trademark of the IBM Corporation) is used to coordinate the functions of the various components shown in FIG. 1.

The computer system 100 can communicate with one or more networks 118 such as a local area network (LAN), a general wide area network (WAN), and/or a public network (e.g., the Internet) via network adapter 116. As depicted, network adapter 118 communicates with the other components of computer system via bus 115. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 2A:
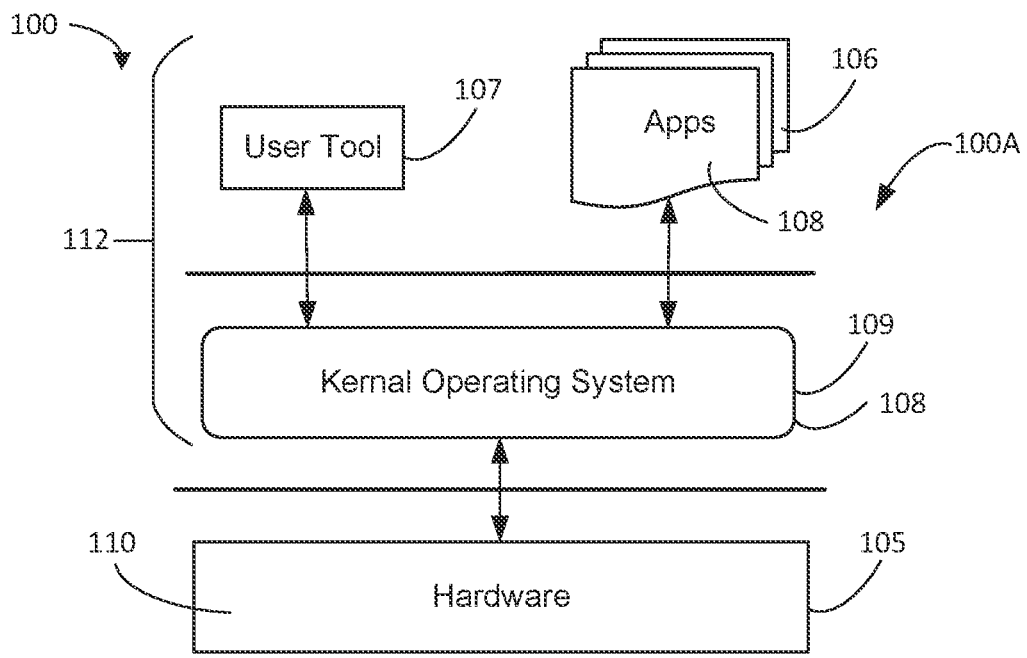
FIG. 2A shows an overview schematic diagram of a non-virtualized exemplary computer system on which the present disclosure may be practiced according to an embodiment.
Figure 2B:
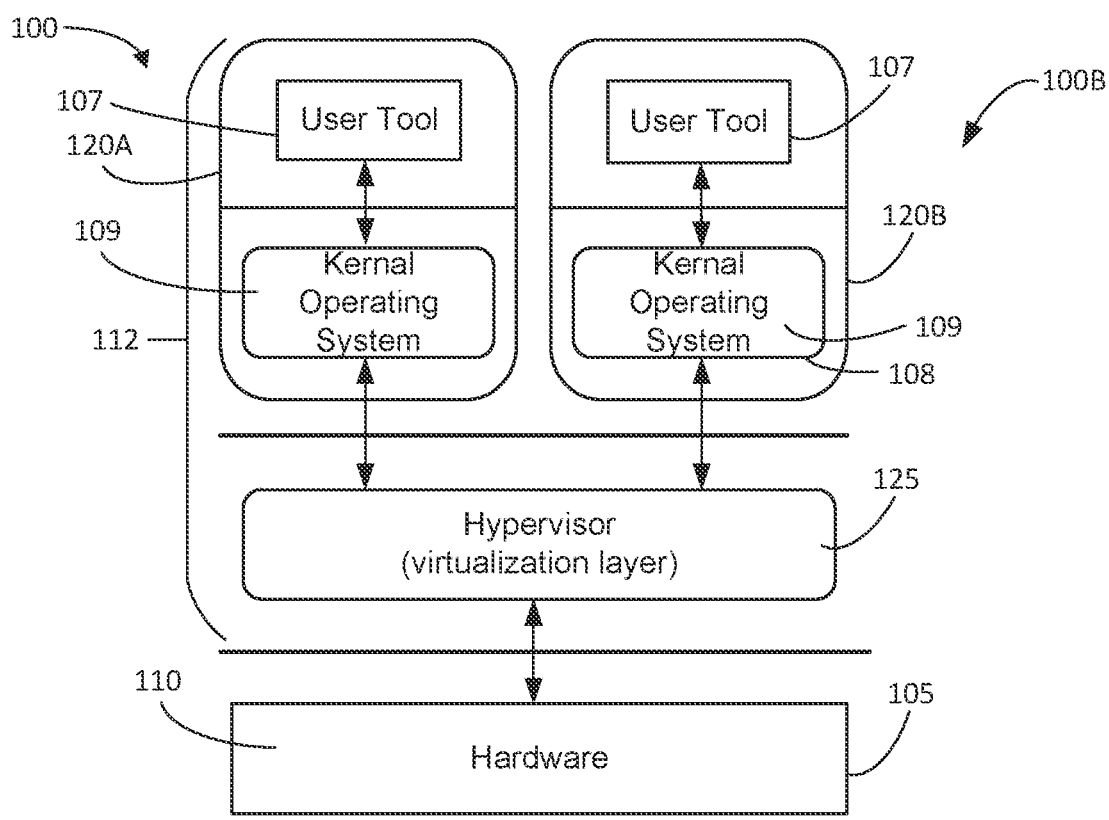
FIG. 2B shows an overview schematic diagram of a virtualized exemplary computer system on which the present disclosure may be practiced according to an embodiment.

FIG. 2A illustrates a block diagram of an example computing environment 100 (e.g., computing system 100) showing a non-virtualized computing system 100A on which the present disclosure can be practiced. In the example of FIG. 2A, non-virtualized computing system 100A includes hardware 105, e.g., processor 110, and memory 112, where memory 112 stores programs 108 such as the kernel operating system (O/S) 109 which interacts with programs 108 illustrated as applications 106 and user tool 107. Hardware 105 in example computing environment 100A is communicatively coupled to memory 112. A further example of a computing environment 100 to incorporate and use one or more aspects of the present disclosure is depicted in FIG. 2B. In the example of FIG. 2B, virtualized computing environment 100B includes one or more virtual machines (120A, 120B), hardware 105 (which may include one or more processors 110), and at least one hypervisor 125. Hardware 105, e.g., one or more processors 110, is communicatively coupled to memory 112 which includes virtualized machines 120 and the at least one hypervisor 125. Each virtualized machine 120 (e.g., virtualized machines 120A & 120B) include kernel operating system 109 and user tool 107.

Figure 3:
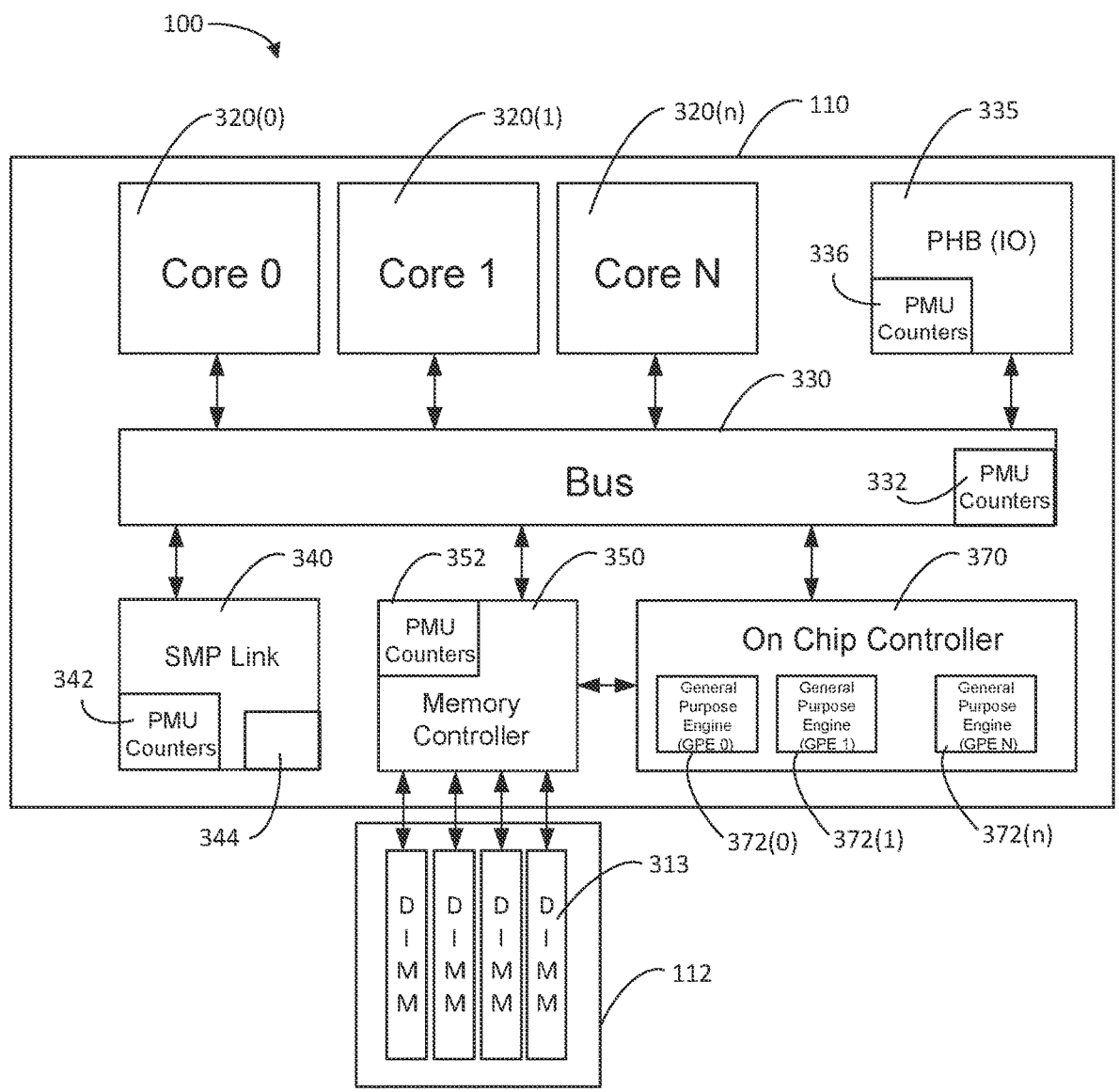
FIG. 3 schematically shows a block diagram of an exemplary processor and associated memory on which the present disclosure may be practiced according to an embodiment.

FIG. 3 illustrates computing system 100 including a more detailed diagram of processor 110 and memory 112 in which an embodiment of the disclosure can be practiced. Processor 110 includes one or more processor cores 320 (e.g., 320(0)-320(n)); PCI Host Bridge (PHB) 335; symmetric multiprocessing (SMP) Link 340; memory controller 350 and On-Chip-Controller (OCC) 370. Bus 330 communicatively couples processor cores 320(0)-320(n) to each other, and to PCI Bridge 335, SMP Link 340, memory controller 350, and the On-Chip-Controller (OCC) 370. The memory controller 350 is communicatively coupled to memory 112, where memory 112 contains one or more Dual Inline Memory Modules (DIMMs) 313. The On-Chip-Controller (OCC) 370, in one or more embodiments, includes one or more general purpose engines (GPEs), for example GPEs 372(0)-372(n). The one or more general purpose engines (GPEs) 372 in an aspect act as microcode engines.

In one or more embodiments, as illustrated in FIG. 3, Bus 330 has one or more Performance Monitoring Unit (PMU) counters 332; PCI Host Bridge 335 has one or more Performance Monitoring Unit (PMU) counters 336; SMP Link 340 has one or more Performance Monitoring Unit (PMU) counters 342; and/or Memory Controller 350 has one or more Performance Monitoring Unit (PMU) counters 352. SMP Link 340 contains a Nest Unit 344 and Nest Unit Performance Monitoring counter 342. The PMU counters are part of Performance Monitoring Units (PMUs). The PMUs contain control registers that have fields that specify which events are counted by the PMU counters. In one or more embodiments, by writing appropriate event codes into these control register fields, the configuration of the PMU control register will change and the PMU counters will start collecting (e.g., counting) new events.

Figure 4:
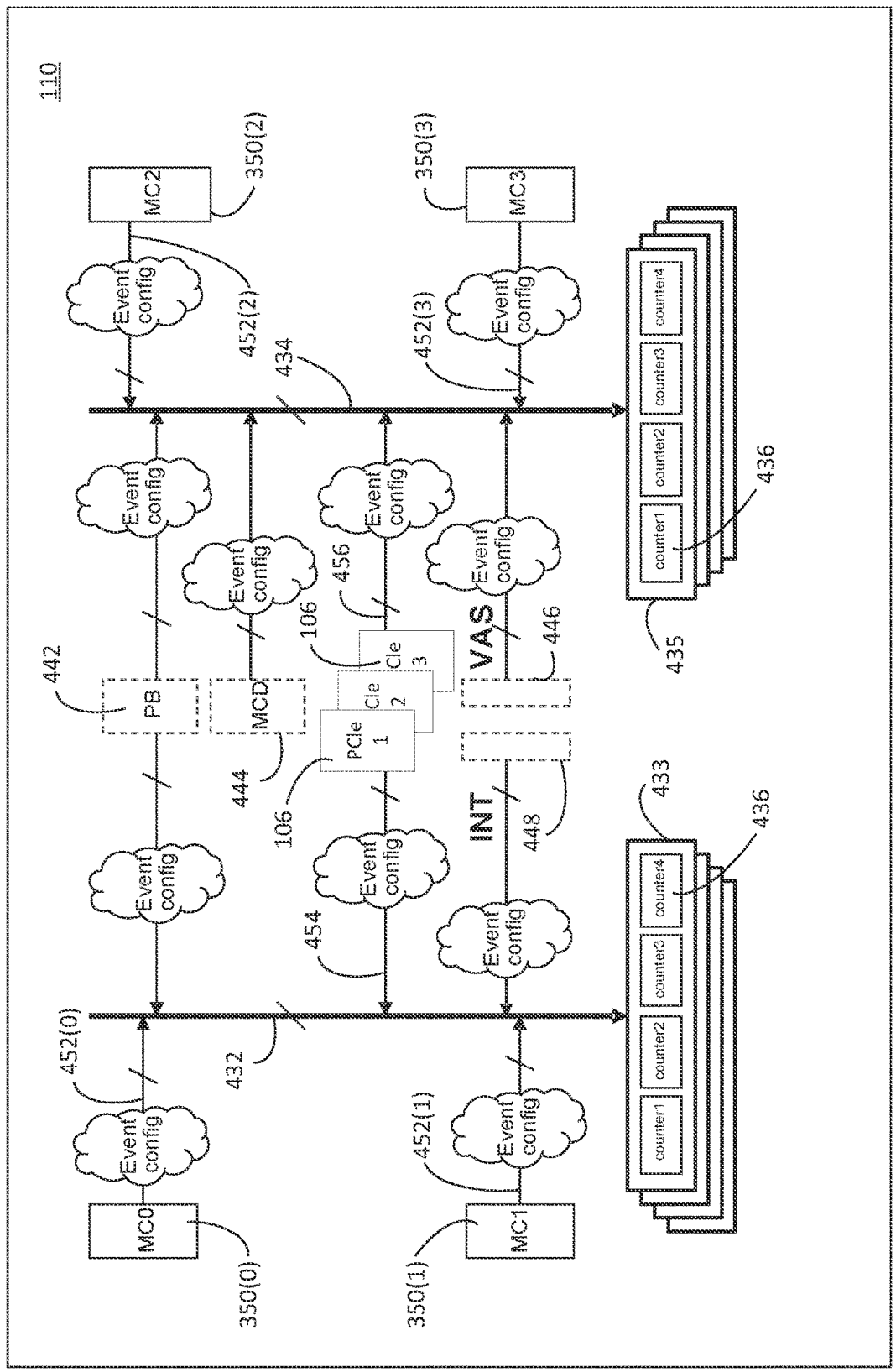
FIG. 4 schematically shows a block diagram of a portion of a processor on which the present disclosure may be practiced according to an embodiment.

FIG. 4 illustrates a Centralized Nest Performance Monitoring architecture diagram of processor 110 in which an embodiment of the disclosure can be practiced. Processor 110 has a west Centralized Nest Performance Monitoring (CNPMw) event bus 432 and an east Centralized Nest Performance Monitoring (CNPMe) event bus 434. West CNPM event bus 432 and East CNPM event bus 434 can be a thirty-two (32) bit event bus, although other size buses are contemplated. There are four PMUlets 433 (e.g., 433(0)-433(3)) corresponding to west Centralized Nest Performance Monitoring (CNPMw) event bus 432 and four PMUlets 435(e.g., 435(0)-435(3)) corresponding to east Centralized Nest Performance Monitoring (CNPMe) event bus 434. Each PMUlet 433, 435 in an embodiment is a System Center Operations Manager (SCOM) register having one or more independent counters. In the embodiment of FIG. 4, each PMUlet 433, 435 is a 64-bit SCOM that has four 16-bit counters 436 (e.g., 436(0)-436(3)). PMU counters 436 count events associated with units, for example, the Power Bus (PB) 442, Memory Coherence Directory (MCD) 444, Virtual Accelerator Switchboard (VAS) 446, and Interrupt (INT) 448, to name a few.

While FIG. 4 shows four PMULets per Centralized Nest Performance Monitoring event bus, it is contemplated that more or less PMULets can be associated with each Centralized Nest Performance Monitoring event bus. In addition, while each PMULet has four 16-bit counters 436, each PMULet can have more or less counters 436, and each counter 436 can have more or less bits. More or less units can be included in processor 110 and associated with each Centralized Nest Performance Monitoring event bus for performance monitoring.

Processor 110 in FIG. 4 further includes four memory controllers 350, including two west memory controllers 350(0), 350(1) and two east memory controllers 350(2), 350(3). West memory controllers 350(0), 350(1) communicate with west CNPM event bus 432 via buses 452(0), 452(1) respectively while east memory controllers 350(2), 350(3) communicate with east CNPM event bus 434 via buses 452(2), 452(3) respectively. Additionally, as shown in FIG. 4, processor 110 includes a Peripheral Component Interconnect (PCI), and more specifically one or more Peripheral Component Interconnect express (PCIe) 106, which communicate with west CNPMw event bus 432 via bus 454 and with east CNPMe event bus 434 via bus 456.

Modern microprocessors have a lot of processing capability distributed across the microprocessor chip. Many microprocessors have main CPU engines, which are primarily used for OS and application execution, and multiple light weight general purpose engines (GPEs) as shown in FIG. 3. These light-weight multipurpose engines, shown as general-purpose engines (GPE) 372 on the On-Chip-Controller 370 in FIG. 3, are sometimes called un-core engines, and are on the chip, but off-core processing units. These general-purpose engines, e.g. GPE 372, have limited capability compared to the main CPU of the chip, but these light-weight engines can be used to execute light-weight functions. Almost all performance monitoring tools run as part of the user-space applications with support of kernel and consume processor core cycles, e.g., core 320 cycles.

In one or more embodiments, a dynamically configurable performance monitoring approach is disclosed where the events which are collected, e.g., counted, are changed. In an approach, a new flag will change the configuration of the PMU control registers and start collecting (e.g., counting) new events. For example, counters that are configured to monitor and/or count events from units like, for example, the Power Bus (PB) 442, Memory Coherence Directory (MCD) 444, Virtual Accelerator Switchboard (VAS) 446, Interrupt (INT) 448, etc. are changed to monitor and count events from different units, for example, from units like memory (e.g., from memory controller 350), PCI or PCI Express (PCIe) 106, etc.

In one or more embodiments, the PMU control registers have fields which specify which events are counted. According to an aspect, by writing appropriate event codes into the fields of the PMU control registers, the configuration of the PMU control register will change and new events will be collected. A PMU, a set of PMUs, or all the PMUs can operate in two modes, a first or monitor mode where the PMU control register(s) is configured so that the counter counts a first event (or set events), and a second or flexible mode where the PMU control register(s) is configured so that the counter counts a second event (or set of events). In an embodiment, in the second or flexible mode, the counters can be configured to count events that are of interest for debugging the processor. In other words, a bank of events can be created that are specific to the flexible mode, and in an example are specific to a debug category of events. In one or more approaches, one or more events, for example the most important events, can continue to be monitored in the first (monitor) mode while at the same time events of interest to debugging can also be monitored. Accordingly, the overall system health can be tracked and monitored while also operating some counters in the second or flexible mode of operation to monitor, for example, metrics for debugging a processor.

In one or more aspects, all events that are monitored and collected from the counters are saved and stored in memory. In an embodiment, with the second (flexible) mode enabled, the flexible mode events, e.g., the debug events, are stored in memory, and preferably the memory area has extra space to store the flexible mode events, e.g., the debug events. The memory space to store the flexible mode events, e.g., the debug events, is preferably separate from the area to store the first monitor mode events. Preferably only events from the second, flexible mode will be saved to the extra space in memory and the extra space in memory will not be used during first, monitoring mode. Preferably each location in memory is mapped to a specific event with for example the monitor mode set of events having their own defined memory region that cannot be used to store a different set of flexible (e.g., debug) mode events. In an embodiment, the second flexible mode collects a different set of events that are stored in a separate region of memory. Accordingly, it is preferred to have extra space to store the different debug mode events.

According to an aspect of the disclosure, the PMU control (configuration) registers are changed, based upon for example system performance, to monitor a specific region (e.g., event) of interest in detail while retaining other (e.g., important) performance monitoring intact. In case the performance of any particular unit degrades, e.g., degrades to a certain point or percentage, or a user desires to look deeper into any performance metrics other than the metrics or events that are currently being tracked, the system or the user can change the configuration of the performance monitoring unit (PMU) and/or counters to monitor different desired events. The conditions that define performance degradation can in one or more examples be set. For example, memory bandwidth (BW) less than X % of total memory bandwidth (BD) can trigger a switch to monitor memory bandwidth where X % can be user configurable, preset during manufacturing, adjustable, and/or programable. In another example, link utilization less than Y % can trigger a switch to monitor link, where Y % is user configurable, preset during manufacturing, adjustable, and/or programable, can trigger a switch to flexi-mode operation where a different event is monitored. In a further embodiment, if memory headroom (e.g., the amount of remaining memory space) is less than Z %, where Z % is user configurable, preset during manufacturing, adjustable, and/or programable, indicating that memory usage is nearing its maximum so that monitoring of different memory parameters can take place.

There is typically a fixed number of counters 436 on which events can be placed (also referred to as PMULets 433), so the number of events that can be tracked and/or collected is typically constrained by the number of counters. For illustration purposes, PMULet1 433 counts three events (event 1 (E1), event 2 (E2), event 3 (E3)) in PowerBus (PW) unit 442 in first or monitor mode. In second, flexible mode these events can be replaced by a different set of events, e.g., event 4 (E4), event 5 (E5), event 6 (E6) belonging to the PowerBus (PB) unit 442, or if some of the PB events can be removed, then a different unit's events can be collected, for example Memory Controller System (MCS) events. By repurposing the counters, the number of events that can be collected, tracked, monitored, and/or counted can be expanded.

Another factor that typically constrains the number of events that can be collected, tracked, monitored, and/or counted is the duration for event collection. The duration for event collection is typically fixed by the hardware settings. Only a limited number of events can be collected in the set or stipulated duration. For example, in the allotted time for the PowerBus (PB) unit 442, only three events can be collected. In the normal monitoring mode, event 1 (E1), event 2 (E2), and event 3 (E3) is collected as part of the PowerBus (PB) unit 442 in the time allotted. In the second, flexible mode, these events can be replaced by a different set of events, event 4 (E4), event 5 (E5), and event 6 (E6) belonging to the PowerBus (PB) unit 442 (or if some of the PowerBus (PB) unit events can be removed), then in the same time duration, a different unit's events can be collected, e.g., Memory Controller System (MCS) events.

In one or more embodiments, the OCC engine(s), e.g., the GPE(s) 372 on the On-Chip-Controller (OCC) 370 handle creating dynamic metrics. The GPE(s) 372 on the On-Chip-Controller (OCC) 370 are used to obtain metering information related to memory, CPU, and other resource utilization, different than the first or normal mode of operation of the PMU counters. In an example, programs in the GPE(s) 372 on the On-Chip-Controller 370 can be executed to change the configuration of the PMU counters 536. Programs in an aspect are written, preferably by users, to create dynamic metrics which get executed by the GPE(s) 372. A new event in an aspect is created by writing a C code and passing the opcodes of the program to the GPE(s) 372 on the OCC 370 which copies the opcodes to the respective microcode memory and modifies the feature of 24×7 microcode to execute the copied opcodes within a defined time interval. According to one or more approaches, a small c-program that will configure the PMU control registers with a new event can be written, preferably by a user. This small piece of c-program (e.g., op-codes) can be stored in memory, preferably in a separate region of memory. When the OCC 370, e.g., the GPE 372 is triggered to run in the second, flexible mode, then this small piece of c-program can be copied into the relevant region in the microcode, which will result in the second, flexible mode of events (e.g., debug-events) to be collected. That is, in an embodiment, program code can be written and/or implemented to create dynamic metrics which get executed by the GPE(s) 372 in the OCC 370.

Figure 5:
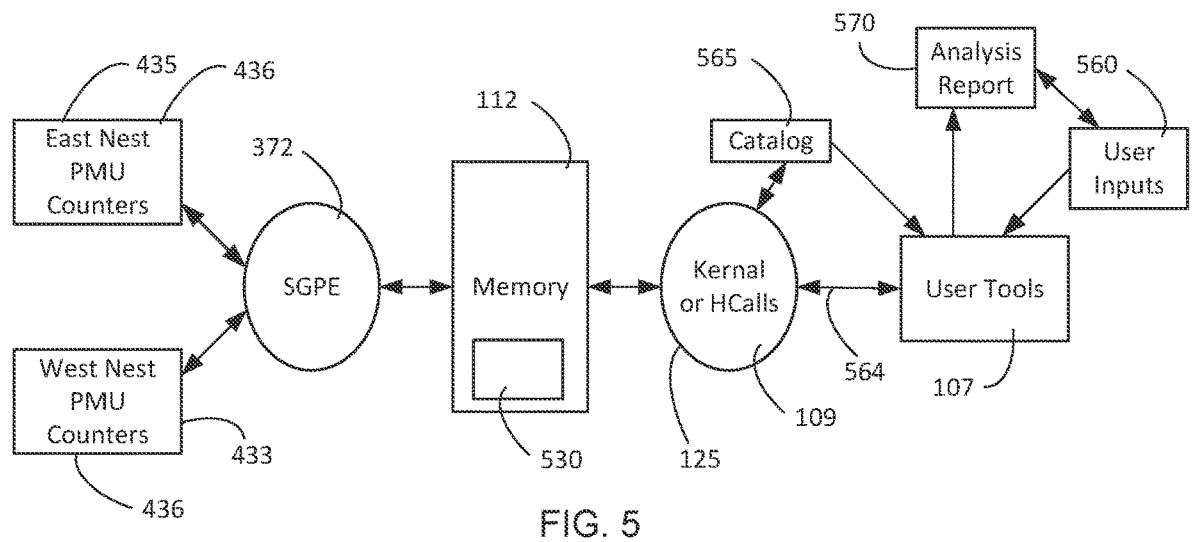
FIG. 5 schematically shows a block diagram of an exemplary system for monitoring the performance metrics of an integrated circuit, e.g., a processor, according to an embodiment of the disclosure.

FIG. 5 illustrates a block diagram of an example of implementing a change in the events tracked by one or more performance monitoring units, and more specifically one or more PMU counters. Catalog 565 in an embodiment contains the list of events and the address in memory where the value will be written. A user makes a user input 560 to user tools 107 to change the events being monitored by one or more of the PMUs (PMULets 433, 435), e.g., one or more of the PMU counters 436. The catalog 565 in an approach will be queried with the event name and the catalog 565 will return the actual address where the event value is stored.

User tools 107 communicates with and makes a call 564 to the hypervisor 125 and/or kernel 109 to request a configuration change in the PMUs 433, 435, and the events being collected, tracked, monitored and/or counted in the counters 436. In a virtualized system, kernel 109 would forward the configuration change request to/through the hypervisor layer 125 to the hardware. An example of user tools 106 can be a script and/or a binary. Memory 112, e.g., a communication area 530 in memory 112, is updated to indicate a change request. Memory 112 is preferably off the processor chip 110. In one or more embodiments, a flag is set and/or a field in a register is set in communication area 530 in memory 112.

Analysis Report 570 contains the details of the various events and their values. The report 570 in an embodiment can also contain higher level derived information from one or more low level events. For example, if there is an event called read_bandwidth and another event called write_bandwidth, a higher-level event called total_bandwidth can be derived from these 2 low level events by a formula: Total_bandwidth=read_bandwidth+write_bandwidth According to one or more embodiments, one or more general purpose engines (GPEs) 372, for example on the OCC 370, poll the memory 112, e.g., the communication area 530 of memory 112, for a change request in the events monitored, collected, tracked, and/or counted by counters 436. That is, the GPE 372 (shown as special general-purpose engine (SPGE) in FIG. 5) looks at memory 112 for user input 560 to change the counters 436 to a different configuration or mode to track, monitor, collect, and/or count different events. The SGPE 372 in FIG. 4 interacts with the west Centralized Nest PMU counters and the east Centralized Nest PMU counters. The general-purpose engine (GPE) 372 has the code to reprogram the PMU control registers so that the counters 436 track different events. The GPE 372, in response to a request to change the monitoring mode and/or events being tracked, programs the PMUs 433, 435, e.g., the counters 436, and keeps monitoring the counters 436. The GPE 372 in an embodiment is on the On-Chip-Controller (OCC) 370, and is not part of the processor cores 320, e.g., the main CPUs. The events collected and/or counted in counters 436, in one or more embodiments, is saved and/or stored in memory 112, preferably in a separate memory area.

Figure 6:
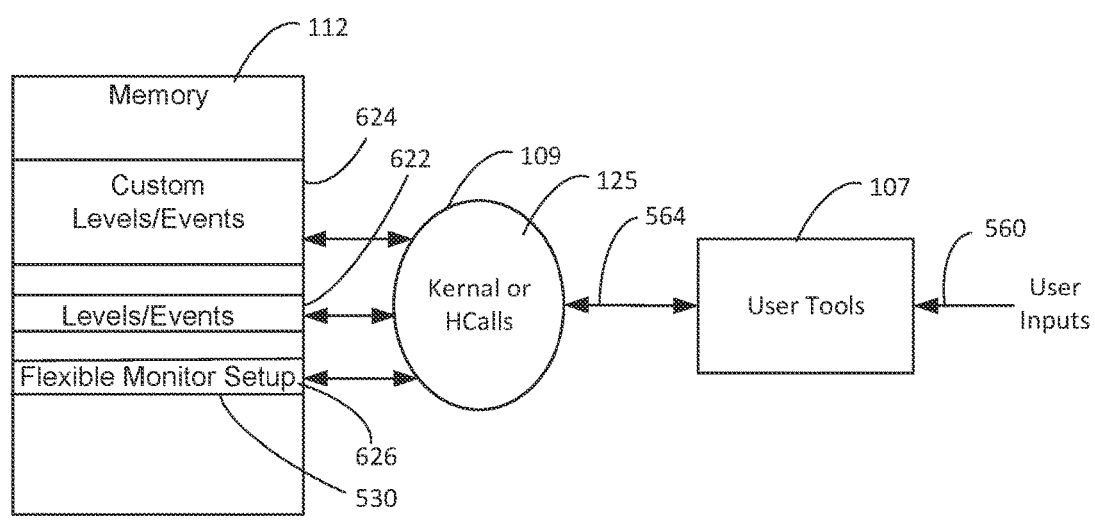
FIG. 6 schematically shows a block diagram of an exemplary control block for monitoring the performance metrics of an integrated circuit, e.g., a processor, according to an embodiment of the disclosure.

FIG. 6 illustrates another example block diagram of a user requesting a change in the events tracked by one or more performance monitoring units, and more specifically one or more PMU counters. A user makes a user input 560 to user tools 107 to change the events being monitored by one or more of the PMUs (PMULets), e.g., one or more of the PMU counters. User tools 107 communicates with and makes a call 564 to the hypervisor 125 and/or kernel 109 to request a configuration change in the PMUs, and the events being collected, tracked, monitored and/or counted in the PMU counters. Memory 112, e.g., a communication area 530 in memory 112, is updated to indicate a change request. Memory 112 can include flexible monitor setup 626 for example where a flag can be set to indicate a configuration change, or mode of operation for event collection and storage. Memory 112 can also include, for example, space 622 where events that are normally monitored, e.g., under first, monitor mode, are collected and stored. In addition, memory 112 can include, for example, custom levels/events area 624, representing space where custom events are collected and stored, e.g., when in second, flexible mode.

Figure 7:
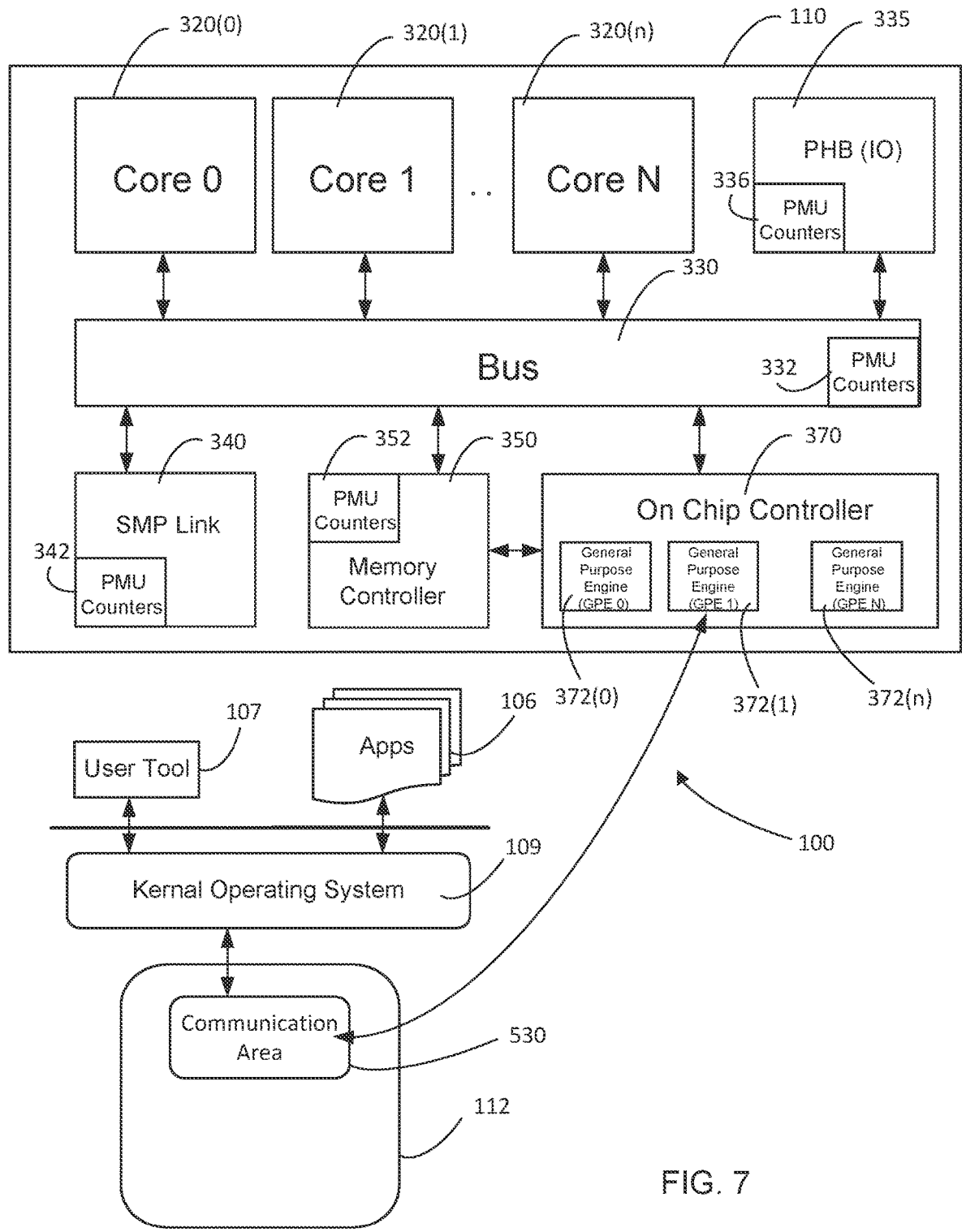
FIG. 7 schematically shows a block diagram of an exemplary processor and associated memory on which the present disclosure may be practiced according to an embodiment.

FIG. 7 illustrates a block diagram of computing system 100 including a block diagram of processor 110 in which an embodiment of the disclosure can be practiced. Processor 110 includes one or more processor cores 320 (e.g., 320(0)-320(n)); PCI Host Bridge (PHB) 335; symmetric multiprocessing (SMP) Link 340; memory controller 350 and On-Chip-Controller (OCC) 370. Bus 330 communicatively couples processor cores 320(0)-320(n) to each other, and to PCI Bridge 335, SMP Link 340, memory controller 350, and the On-Chip-Controller (OCC) 370. The memory controller 350 is communicatively coupled to memory 112, where memory 112 contains a communication area 530. The On-Chip-Controller (OCC) 370, in one or more embodiments, includes one or more general purpose engines (GPEs), for example GPEs 372(0)-372(n). The one or more general purpose engines (GPEs) 372 act as microcode engines. At least one GPE 372 communicates with the communication area 530 in memory 112. In one or more embodiments, the communication area 530 is updated when a configuration change is requested, and in an aspect a flag is set in communication area 530. Processor 110 in an aspect further includes a number of Performance Monitoring Units (PMUs), including one or more PMU counters, as described in connection with FIGS. 3 & 4. FIG. 7 illustrates the at least one GPE 372 communicating with communication area 530.

The system and/or method can be applied to one or more counters to change the events that are monitored by the respective counters. In an embodiment, the system and/or method can be implemented in a manner to operate in a monitor mode where a first set of events are monitored and in a flexible mode ("Flexi-Mode") where some of the first set of events continue to be monitored and a different second set of events are monitored. Table 1 below certain performance metrics of the system are monitored in flexible mode as are a few pre-selected events (from for example PowerBus (PB), memory (MEM), PBCQ, CAPP, NPU) to help debug a performance bottle neck.

TABLE 1

Characteristics and Parameters measured in Monitor Mode v. Flexible Mode

| Monitor Mode | Flexible Mode | Description |
| --- | --- | --- |
| PB | APM | replace APM counters for PB Snoop utilization and other external and internal BW |
| MCD | PCIe | Specific PCIe_n event can be monitored |
| INT | MC01 | Replace INT events by MC events for memory debug |

TABLE 1-continued

Characteristics and Parameters
measured in Monitor Mode v. Flexible Mode

| Monitor Mode | Flexible Mode | Description |
| --- | --- | --- |
| VAS | MC23 | Replace VAS events by MC events for memory debug |
| MC01 | MC01 | Memory monitor Mode events |
| MC23 | MC23 | Memory monitor Mode events |
| PCIe0-2 | PCIe0-2 | PCIe Monitor Mode events |
| Electrical | Electrical | Based on situation, PMUlet2 can be chosen to only IN or OUT events |
| Optical Link | Optical Link | Based on situation, PMUlet2 can be chosen to only IN or OUT events |
| NX | NX | Based on situation, PMUlet2 can be chosen to monitor specific engine events |
| NVLINKS | NVLINKS | NVLINKS specific debug |
| NPU | NPU | NPU Specific Debug |
| PHB | PHB | based on memory/IO debug, the PCIe events can be reserved for PCIe or Memory events |
| CAPP | CAPP | Based on situation, PMUlet2 can be chosen to monitor APC/XTP events only |
| MCA | MCA | This can be entirely used for Debug as MC events cover monitor mode events |
| NMMU | NMMU | Based on situation, PMUlet2 can be chosen to monitor specific events |

Figure 8:
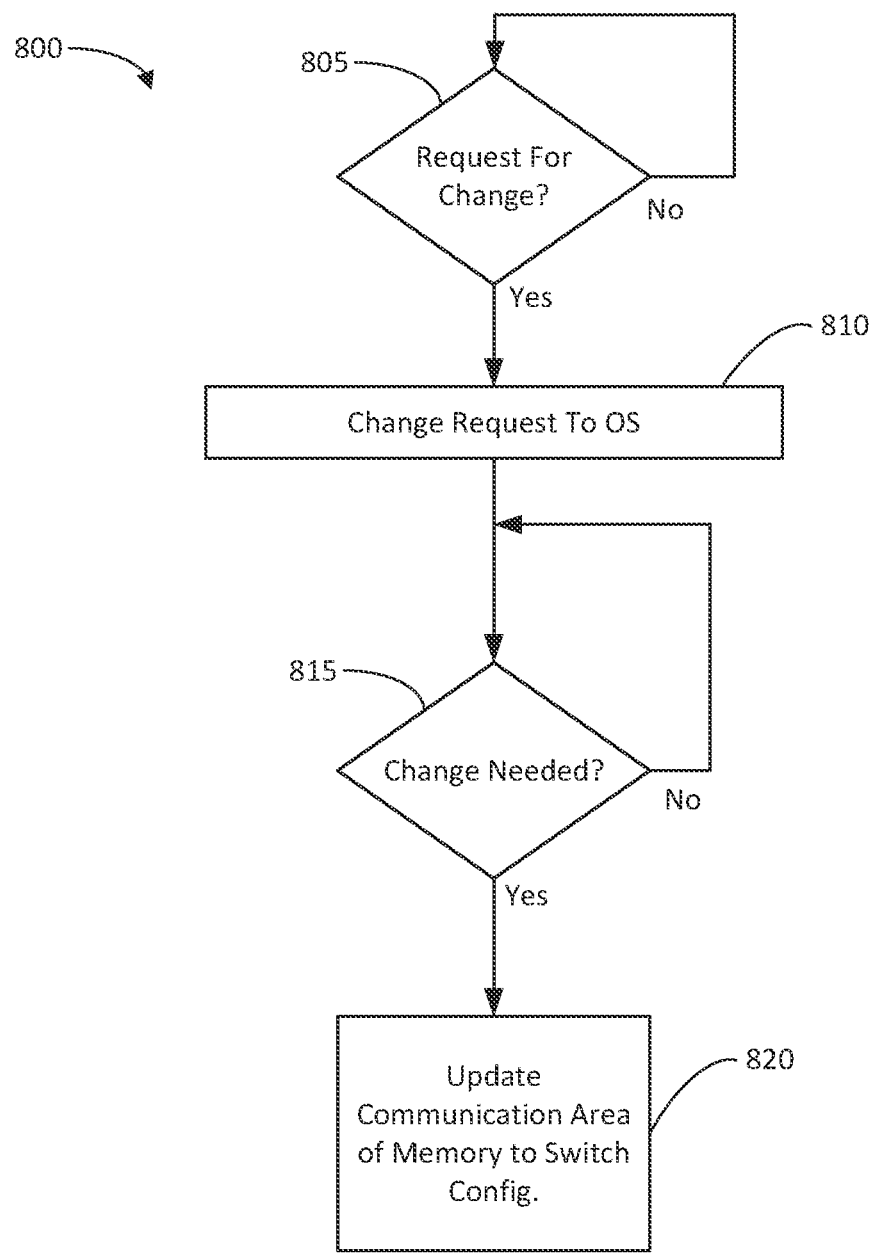
FIG. 8 shows a flow chart of a method of monitoring the performance of an integrated circuit, e.g., a processor, according to an embodiment of the disclosure.

FIG. 8 outlines an exemplary flowchart in accordance with various embodiments illustrating and describing a method 800 of implementing a change in monitoring performance metrics in integrated circuits, including in an embodiment, a system software view of dynamically reconfiguring hardware Performance Monitoring Units to monitor different events. While the method 800 is described for the sake of convenience and not with an intent of limiting the disclosure as comprising a series and/or a number of steps, it is to be understood that the process 800 does not need to be performed as a series of steps and/or the steps do not need to be performed in the order shown and described with respect to FIG. 8, but the process 800 can be integrated and/or one or more steps can be performed together, simultaneously, or the steps can be performed in the order disclosed or in an alternate order.

In process 800 at 805 it is determined whether a request to change the events being monitored in an integrated circuit, e.g., a processor, has been inputted. In an embodiment, a user makes a request to change the events being monitored in a processor, and at 805 it is determined whether a user has made a request to change the events being monitored in the processor. In an embodiment, changing the events being monitored by one or more PMU counters is advantageous, and in an approach changing the events being monitored by one or more PMU counters to instead monitor potential performance bottlenecks for debugging purposes can be beneficial. In an embodiment, it can be determined whether or not there has been a performance degradation, for example in memory bandwidth, and in response a request to change the events monitored by one or more counters, e.g., PMU counters, can be triggered. If at 805 it is determined that a request to change the events being monitored in an integrated circuit has been triggered (805: Yes), then process 800 proceeds to 810. On the other hand, if it is determined at 805 that a request to change the events being monitored has not been triggered (805: No), then the process 800 continues to monitor for a request to change the events being monitored by the one or more counters.

If at 805 it is determined that a request to change the events to be monitored has been instituted or is otherwise pending or desirable, then at 810 a change request issues to the operating system and at 815 it is determined whether a change in the events being monitored is needed. If no change in events being monitored is needed (815: No) then process 800 continues to monitor to determine if a change in the events to be monitored is needed. Alternatively, if at 815 it is determined that no change in events to be monitored is needed (815: No), then process 800 can proceed to 805. If at 815 it is determined that a change in events to be monitored is needed (815: Yes), then the process 800 continues to 820 where the memory is updated to switch the configuration of the counters to monitor and track different events. In an embodiment, at 820 a communication area of the memory is updated to switch the configuration. In an approach a flag is set in memory, e.g., in communication area in memory, to switch the configuration of the PMU counters to measure different events.

Figure 9:
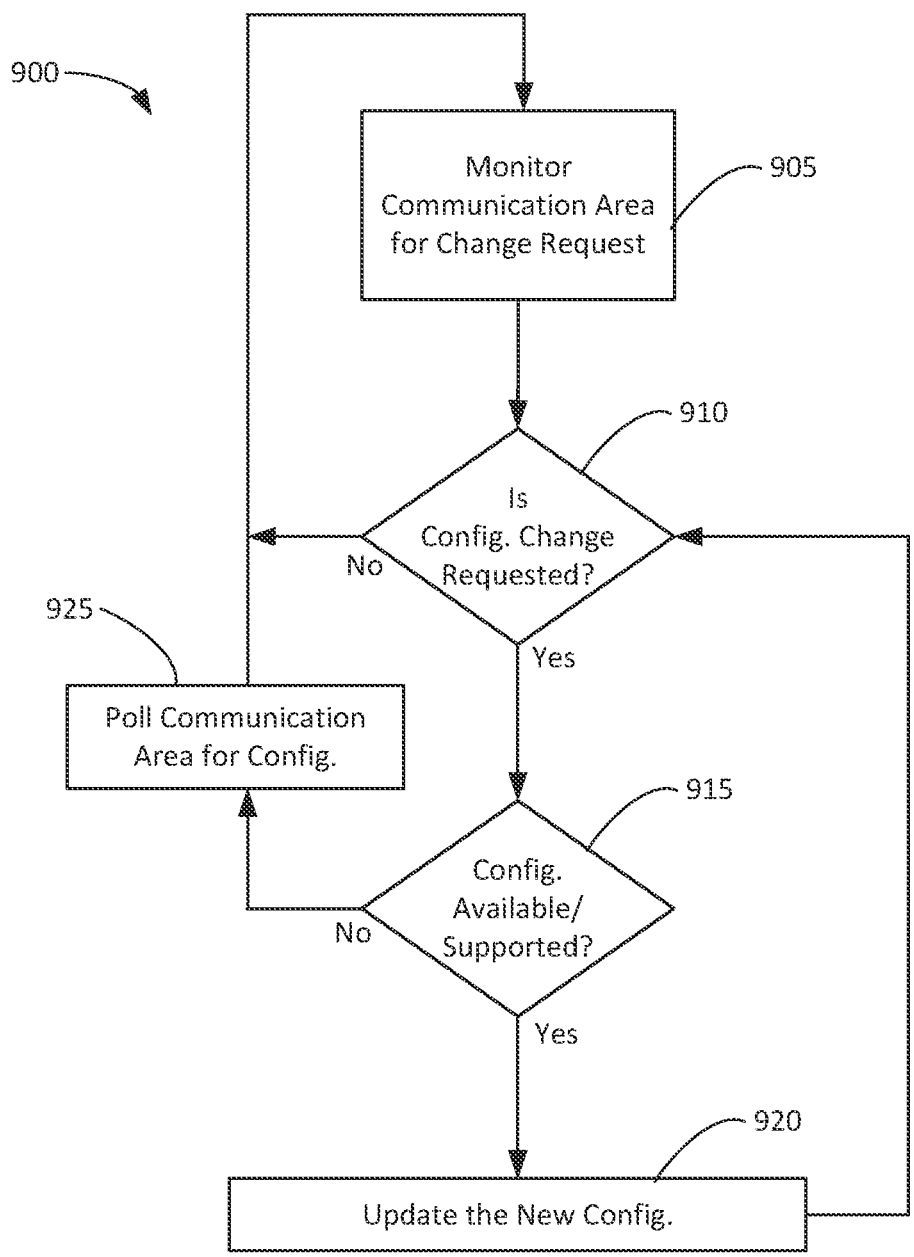
FIG. 9 shows a flow chart of a method of monitoring the performance of an integrated circuit, e.g., a processor, according to an embodiment of the disclosure.

FIG. 9 outlines an exemplary flowchart in accordance with various embodiments illustrating and describing a method 900 of implementing a change in monitoring performance metrics in integrated circuits, including in an embodiment, dynamically reconfiguring hardware Performance Monitoring Units to monitor different events. While the method 900 is described for the sake of convenience and not with an intent of limiting the disclosure as comprising a series and/or a number of steps, it is to be understood that the process 900 does not need to be performed as a series of steps and/or the steps do not need to be performed in the order shown and described with respect to FIG. 9, but the process 900 can be integrated and/or one or more steps can be performed together, simultaneously, or the steps can be performed in the order disclosed or in an alternate order.

In process 900, at 905 the communication area of memory is monitored to determine at 910 if a change or switch in the events to be monitored has been implemented. For example, memory, e.g., communication area of memory, is monitored at 905 to determine at 910 if a configuration change in the PMU counters has been requested. If it is determined at 905 that a configuration change has not been requested, then process 900 continues to monitor memory at 905. If on the other hand the events to be monitored (e.g., a configuration change to the counters) has been requested (910: Yes), then process 900 continues to 920 where it is determined whether the configuration that is being requested, e.g., the events to be monitored, are supported. If at 920, it is determined that the requested configuration e.g., the events requested to be monitored) is supported (920: Yes), then process 900 continues to 925, where the new configuration is implemented (e.g., the events to be monitored is changed). If at 920 it is determined that the requested configuration is not supported (920: No), then process 900 will proceed to 925 where memory, e.g., communication area of memory, is polled for the requested configuration and the process proceeds to 905 where monitoring for a change configuration request continues. In one or more embodiments, the activities of process 900 are continuously running in microcode in a loop.

Figure 10:
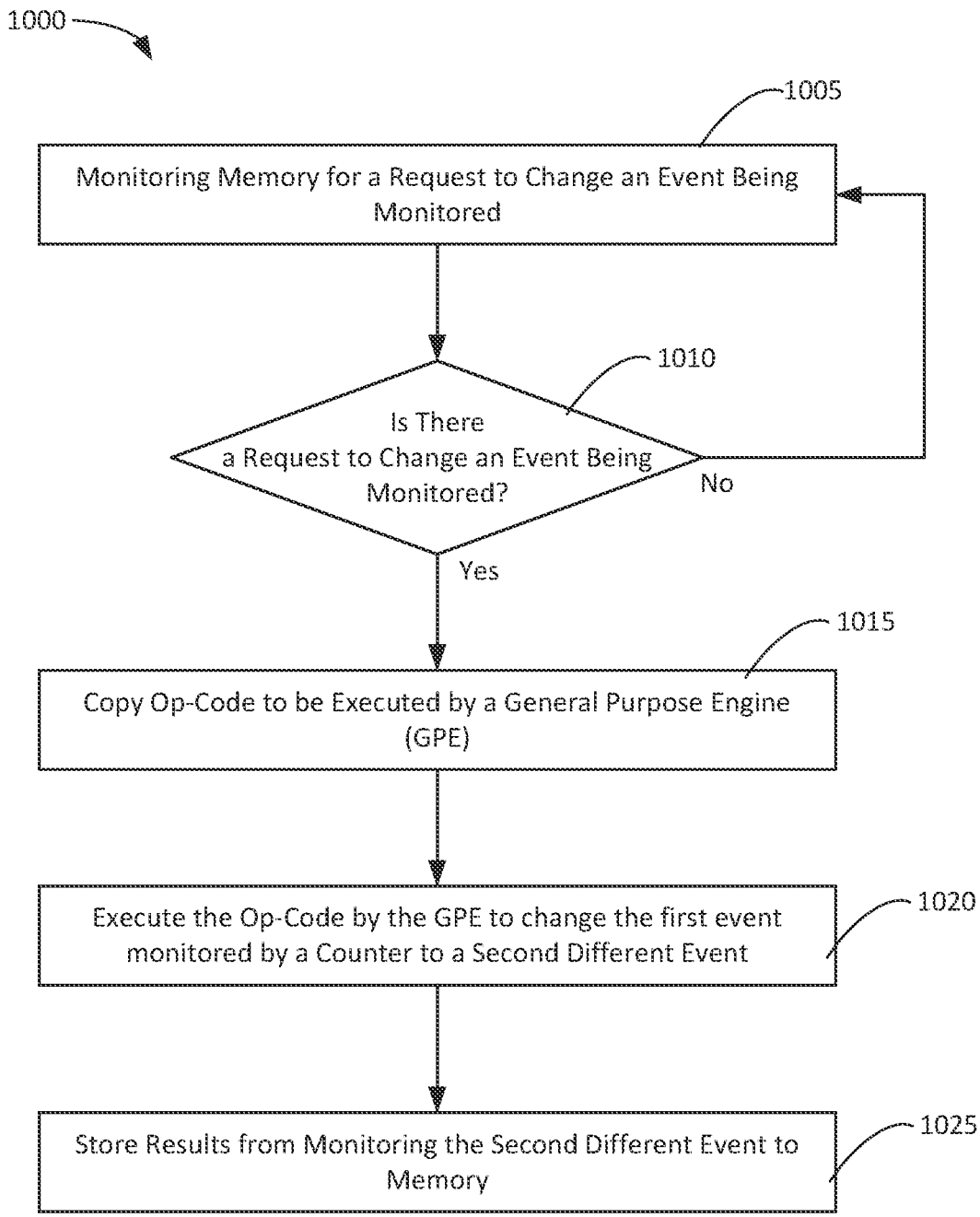
FIG. 10 shows a flow chart of a method to change the events being monitored in an integrated circuit, e.g., a processor according to an embodiment of the disclosure.

FIG. 10 outlines an exemplary flowchart in accordance with various embodiments illustrating and describing a method 1000 of implementing a change in monitoring performance metrics in integrated circuits, including in an embodiment, dynamically reconfiguring hardware Performance Monitoring Units to monitor different events. While the method 1000 is described for the sake of convenience and not with an intent of limiting the disclosure as comprising a series and/or a number of steps, it is to be understood that the process 1000 does not need to be performed as a series of steps and/or the steps do not need to be performed in the order shown and described with respect to FIG. 10, but the process 1000 can be integrated and/or one or more steps can be performed together, simultaneously, or the steps can be performed in the order disclosed or in an alternate order.

In process 1000, at 1005 a system, and in an embodiment memory (e.g., a communication area of memory) is monitored for a request to change an event being monitored by and/or in a system. At 1010 it is determined whether there has been a request to change an event being monitored by and/or in the system, e.g., change in the event being measured by a counter in a PMUlet. In one or more embodiments, a user can request a change in the monitoring of events, for example request a change in the monitoring of a first event to a second event. In other aspects, it can be determined whether or not a characteristic of the system, e.g., a performance characteristic, is less than a percentage, and in response to the characteristic being less than a percentage the system can institute a request to change the monitoring of a first event to a second different event, and in an approach, in response to the characteristic being less than a percentage the monitoring of the first event can be changed to monitor the second different event.

The characteristic in one or more embodiments can consist of a group consisting of memory bandwidth, link utilization, memory overhead, and combinations thereof. It can be appreciated that more than those three identified characteristics of memory bandwidth, memory overhead, and link utilization can be implemented. The percentage can be use configurable, fixed, preset, predefined, adjustable, programmable, machine learned, and combinations thereof, where different percentages can be set for different characteristics. While the process has been described by reference to determining whether a characteristic, e.g., memory bandwidth, memory overhead, and link utilization, is less than a percentage, it can be appreciated that equal to comparisons and greater than percentages could be used to determine whether to monitor a second, different event. In one or more embodiments, where a request to change the events being monitored is to be implemented, for example, where a user requests a change in the events to be monitored, a flag can be set, for example a flag can be set in memory, e.g., in a communication area in memory.

If at 1010 it is determined that there is no request to change the events to be monitored, e.g., counted by a counter in a PMULet (110: No), then the process 1000 continues back to 1005 where monitoring continues. If at 1010 it is determined that there is a request to change the events being monitored, e.g., to switch to a flexi-mode from a normal mode, or change from a first event to a different second event (1010: Yes), then the process continues to 1015. At 1015, Op-Code is copied to a General Processing Engine (GPE) for execution by the GPE. The GPE is preferably not part of the one or more processing cores on the processor, and in an embodiment is part of the On-Chip-Controller. In one or more approaches, the op-code, e.g., c program code, is written and stored in memory, preferably written by a user, and preferably stored in main memory, preferably in a separate region of memory. In one or more embodiments, the op-code is passed to the GPE for execution. An embodiment to implement flexi-mode is to provide a set of op-codes/program the GPE can use to update the configuration at run-time to fetch the new set of events in the flexi-mode operation.

The process 1000 continues to 1020 where the op-code is executed to change one or more events being monitored. In one or more embodiments, the op-code is executed to change a first event being monitored by a counter to a second different event being monitored by that same counter. In an approach, the configuration of a counter is changed at 1020 to monitor the second different event. In an aspect, executing the op-code by the GPE changes the configuration of a counter monitoring a first event to monitor a second event. The GPE in one or more aspects has the code to reprogram one or more control registers of the associated one or more counters so that the one or more counters track different events. In an approach, the GPE programs the control register of the respective counter for a different event and keeps monitoring the counters.

In a further embodiment, executing the op-codes by the GPE changes the events measured by a number or plurality of the counters but not all the counters. In this manner, new events can be monitored for example to debug performance bottlenecks in an integrated circuit (e.g., a processor), while monitoring a number of the main performance events can remain the same so important performance monitoring can continue unchanged. The process 1000 can be used to change the events being monitored from a normal set of events (referred to as Monitoring mode) to a specialized set of events (referred to as FlexiMode), which can be customized for debugging purposes.

The process 1000 can optionally proceed to 1025 where the results from monitoring the second events are stored in a different area of memory than the results from monitoring the first or normal events. For example, the results from the counter or counters measuring and/or monitoring the second event or second group of events are stored in an area of memory that is different than the area of memory used to store the results from the counter or counters measuring and/or monitoring the first event or first group of events.

It will be understood that one or more blocks of the flowchart illustrations in FIGS. 8-10, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for changing the monitoring of a first event to a second different event in a data processing system comprising a processor and a memory that is not local to the processor, wherein the processor has one or more processor cores and a general-processing-engine that is not part of the one or more processing cores, the method comprising:
    monitoring, using the general-processing-engine, the first event by a counter on the processor;
    determining whether a change in the monitoring of the first event to the second different event has been requested;
    copying, in response to a request to change the monitoring of the first event to the second different event, op-codes from memory into microcode executable by the general-processing-engine;
    executing the op-codes from memory by the general-processing-engine to change the first event monitored by the counter on the processor to the second different event; and
    monitoring, using the general-processing-engine, the second different event by the same counter on the processor that monitored the first event.

2. The method of claim 1, wherein determining whether a change in the monitoring of the first event to the second different event has been requested comprises monitoring a communication area of memory for a change request to change the monitoring of the first event to the second different event.

3. The method of claim 1, further comprising requesting a change in the monitoring of the first event to the second different event.

4. The method of claim 3, wherein requesting a change in the monitoring of the first event to the second different event is made by a user.

5. The method of claim 1, further comprising:
    determining whether a characteristic is less than a percentage; and
    changing, in response to the characteristic being less than the percentage, the monitoring of the first event to the second event,
    wherein the percentage is at least one of a group consisting of: user configurable, preset, predefined, fixed, adjustable, programable, and combinations thereof.

6. The method of claim 5, wherein the characteristic is at least one of a group consisting of: memory bandwidth, link utilization, memory headroom, and combinations thereof.

7. The method of claim 1, further comprising writing the op-codes into memory.

8. The method of claim 1, further comprising storing in memory the results of the second event in a different area of memory than the results of the first event.

9. The method of claim 1, wherein executing the op-codes from memory by the general processing engine changes the configuration of the counter to monitor the second different event.

10. A data processing system comprising:
    a processor having one or more processing cores, one or more memory controllers, one or more general purpose engines on an On-Chip Controller that is not part of the one or more processing cores, and one or more links for communicatively coupling the one or more processing cores, the one or more memory controllers, and the On-Chip-Controller having the one or more general processing engines, the processor further comprising one or more performance monitoring units having one or more counters, each counter having an associated configuration register; and
    main memory communicatively coupled to the processor via a memory bus,
    wherein the system is configured to:
        monitor, by at least one of the general processing engines on the On-Chip-Controller a first event by one of the one or more counters on the processor;
        determine whether a change in the monitoring of the first event to the second different event has been requested;
        copy, in response to a request to change the monitoring of the first event to the second different event, op-codes from main memory into microcode executable by the at least one of the general processing engines on the On-Chip-Controller;

execute the op-codes from memory by the at least one of the general processing engines to change the first event monitored by the one of the one or more counters on the processor to the second different event; and monitor, by the at least one of the general processing engines on the On-Chip-Controller, the second different event by the same one of the one or more counters on the processor that monitored the first event.

11. The system of claim 10, further configured to monitor a communication area of main memory for a change request to change the monitoring of the first event to a second different event.

12. The system of claim 11, further configured to set a flag in the communication area of main memory to request a change in the monitoring of the first event to the second different event.

13. The system of claim 12, further configured to set the flag in response to a user input to change the monitoring of the first event to the second different event.

14. The system of claim 10, further configured to:
determine whether a characteristic is less than a percentage; and
changing, in response to the characteristic being less than the percentage, the monitoring of the first event to the second event,
wherein the percentage is at least one of a group consisting of: user configurable, preset, predefined, fixed, adjustable, programable, and combinations thereof.

15. The system of claim 14, wherein the characteristic is at least one of a group consisting of: memory bandwidth, utilization of the one or more links, main memory headroom, and combinations thereof.

16. The system of claim 10, further comprising writing the op-codes into main memory, and executing the op-codes by the general processing engine changes a configuration of a counter monitoring the first event to monitor the second different event.

17. The system of claim 10, further comprising storing in main memory the results of the second event in a different area of memory than the results of the first event.

18. The system of claim 10, wherein the system is configured to change from a first mode of operation to a second mode of operation where a plurality but not all of the events monitored by the one or more counters are changed in response to a request to change the first event to a second different event.

* * * * *